Figure 1:
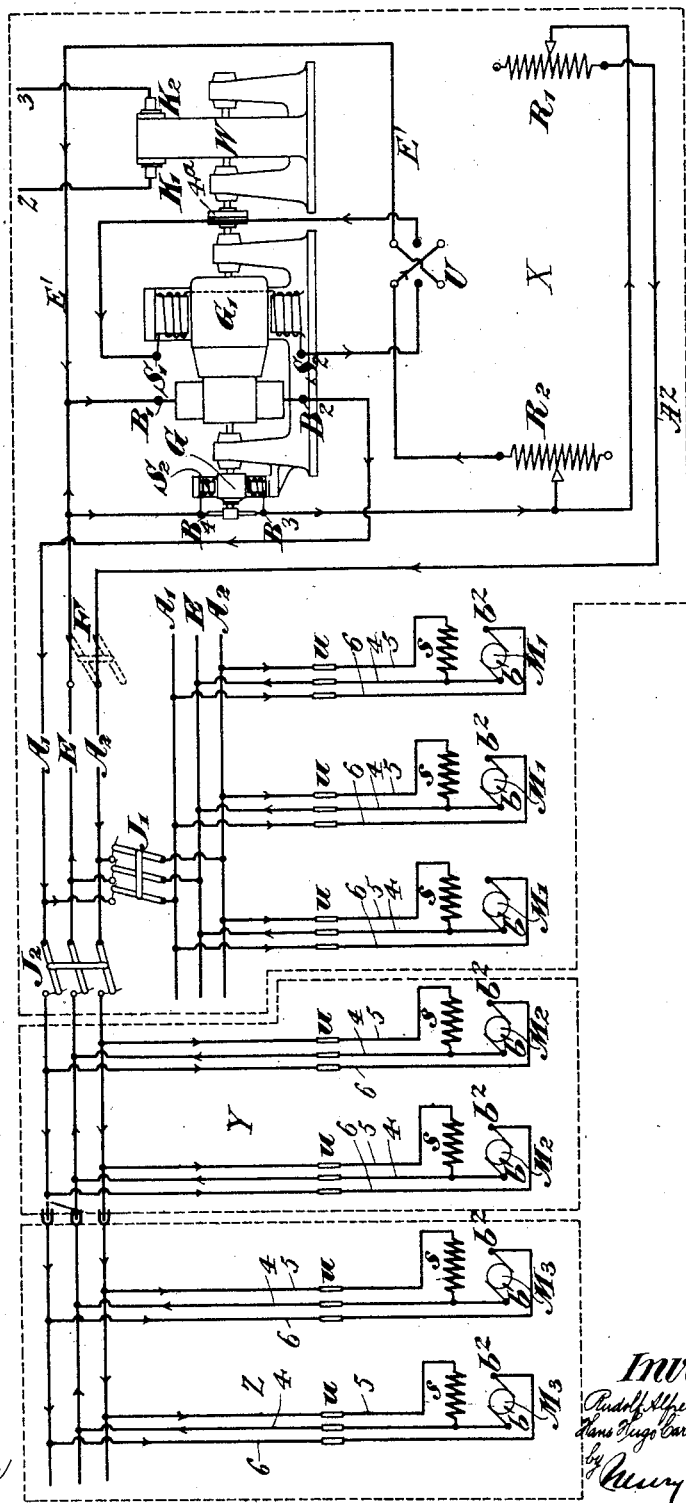

No. 754,565. PATENTED MAR. 15, 1904.
R. A. E. HUBER & H. H. C. BEHN-ESCHENBURG.
ELECTRIC RAILWAY.
APPLICATION FILED DEC. 23, 1901.
NO MODEL. 2 SHEETS—SHEET 1.

Witnesses:

Inventors.

No. 754,565. PATENTED MAR. 15, 1904.
R. A. E. HUBER & H. H. C. BEHN-ESCHENBURG.
ELECTRIC RAILWAY.
APPLICATION FILED DEC. 23, 1901.
NO MODEL. 2 SHEETS—SHEET 2.
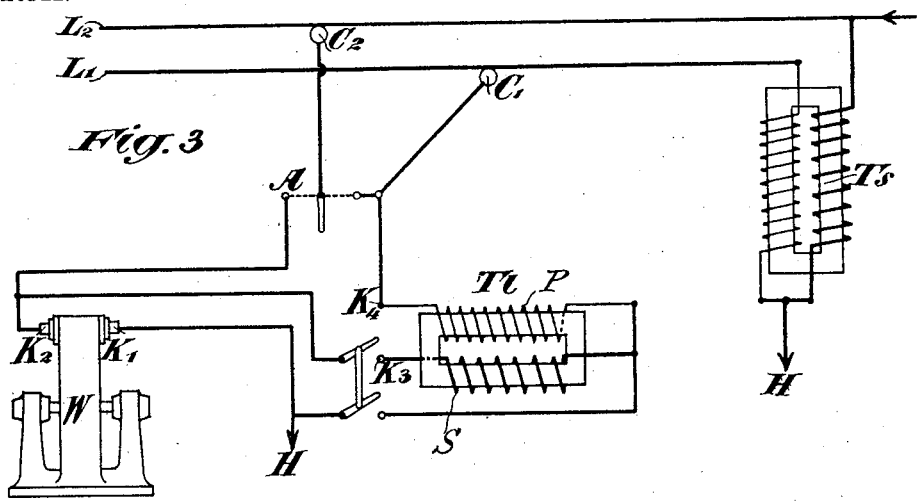
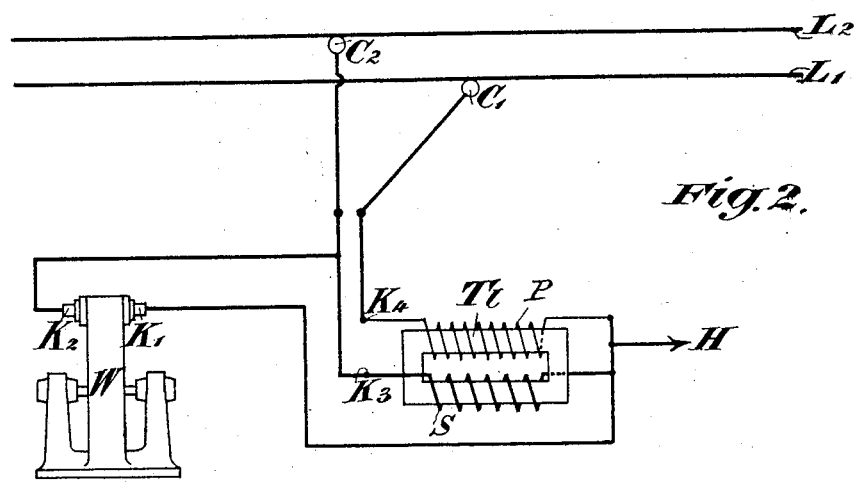
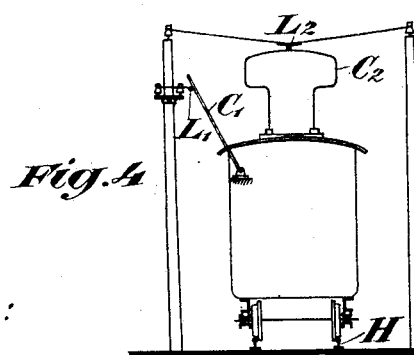
Witnesses: Inventors.

No. 754,565.

Patented March 15, 1904.

UNITED STATES PATENT OFFICE.

RUDOLF ALFRED EMIL HUBER AND HANS HUGO CARL BEHN-ESCHENBURG, OF ZURICH, SWITZERLAND, ASSIGNORS TO THE FIRM OF MASCHINENFABRIK-OERLIKON, OF OERLIKON, NEAR ZURICH, SWITZERLAND.

ELECTRIC RAILWAY.

SPECIFICATION forming part of Letters Patent No. 754,565, dated March 15, 1904.

Application filed December 23, 1901. Serial No. 86,986. (No model.)

*To all whom it may concern:*

Be it known that we, RUDOLF ALFRED EMIL HUBER, a citizen of the Republic of Switzerland, and HANS HUGO CARL BEHN-ESCHENBURG, a citizen of Prussia, Empire of Germany, both residing at Zurich, Switzerland, have invented new and useful Improvements in Electric Railways, of which the following is a specification.

This invention relates to electric-railway systems designed principally for long-distance lines and interurban service, and has for its object the combination, with alternate-current line-sections having different voltages, of a car, an alternate-current motor thereon, a continuous-current generator coupled thereto, motors operated by the continuous current, and transformers to transform the voltages of the sections of line to the voltage of the alternate-current motor.

Referring to the drawings, in which like parts are similarly designated, Figure 1 is a diagrammatic view illustrating a locomotive and two motor-cars coupled thereto, with their electrical connections. Fig. 2 is a diagrammatic view showing two line-wires carrying current of different potential and two current-collectors and a step-down transformer through which the potential of one current is lowered before operating the motor. Fig. 3 is a similar view of a modification. Fig. 4 is an end view of a locomotive, showing the arrangement of current-collectors with relation to the line-wires.

Referring to Fig. 1, $G_1$ indicates a continuous-current generator coupled at $4^a$ to and driven by an alternate-current motor W.

G is a smaller generator to furnish the exciting-current for the generator $G_1$ and, if required, for the motors $M_1$ on the vehicle X, carrying the said machines, and the motors $M_2$ $M_3$ on the trailers Y Z.

$R_2$ is a resistance-switch in the circuit E' for varying the voltage of generator $G_1$ for the purpose of varying torque and speed of the motors $M_1$ $M_2$ $M_3$.

$R_1$ is a resistance-switch to vary the field excitation of the motors $M_1$ $M_2$ $M_3$.

U is a reversing-switch to change the direction of travel; F, a switch to either connect up the motors $M_1$ $M_2$ $M_3$ as series motors to the terminals $B_1$ $B_2$ of generator $G_1$ or as separately-excited motors to the terminals $B_1$ $B_2$, with their armatures, and to the terminals $B_3$ $B_4$, with their exciting-coils.

$J_1$ $J_2$ are switches to cut out or in motors or groups of motors $M_1$ $M_2$ $M_3$, and $u$ are safety cut-outs individual to each motor, the fields $s$ of which are connected by 4 and 5 to the mains E and $A_2$, supplied by the generator G, while the armatures are supplied by current from the main $A_1$, lead 6, brushes $b^2$ and $b'$, and return connection 4.

$K_1$ $K_2$ are the two terminals of the winding of the alternate-current motor.

The current in the line will generally be a single-phase alternating current and will be supplied by a single wire $L_1$, suspended from insulators, and the rails H used as a return-circuit.

The voltage of the line will in most cases be higher than applicable directly to the alternate-current motor W on the locomotive. To reduce this high voltage, the locomotive carries a step-down transformer $T_1$, Figs. 2 and 3, the high-pressure coil P of which is connected to the current-collector C', tapping current from the line, while the low-tension coil S is connected to the winding of the motor W.

Current of different voltage may be supplied to different portions of the line from the same source of current. One section may be directly connected to this source of current, as $L_2$ in Fig. 3, and the other, $L_1$, to a stationary transformer $T_s$, which may transform the tension of the current of $L_2$ up or down, as desired.

The low-voltage current is preferably used at large railway-stations, while at smaller stations and in the open country the high voltage is supplied. For the purpose of operating the motor-generator W with the different voltages a static transformer $T_1$, Figs. 2 and 3, is placed on the locomotive, the ratio of which is similar to that of the stationary transformer $T_s$. In this way the terminal voltage at the motor remains practically the same whether the train is traveling along high or low voltage contact-wires. The transformer $T_1$ may without the invention being essentially altered be provided with a number of terminals or taps, so that it becomes within more or less wide limits a transformer with variable ratio, which may be used in known ways.

The locomotive is equipped with different current-collectors (trolleys, arches) or groups of current-collectors, which correspond to the contact-wires under the different voltages and which are so arranged that the one current-collector or group of collectors touch only the contact-wire under the high voltage, while the other current-collector or group of collectors touch only the contact-wire under low voltage. According to this the first current-collector is connected to a high-voltage terminal of the static transformer on the locomotive, while the second current-collector is connected to a low-voltage terminal of the static transformer on the locomotive or directly with one terminal of the alternate-current motor.

In the diagram Fig. 2 the lines $L_1$ $L_2$ represent the contact-wires—$L_1$ the one with the high voltage and $L_2$ the one with the low voltage. The wire $L_1$ may, for instance, be suspended laterally, Fig. 4, of the train on poles and may be touched by a contact-making rod $C_1$, pivoting on an axis suitably placed on the locomotive. The wire $L_2$ may, for instance, be suspended on span-wires and may be touched by an arch $C_2$. $C_1$ is connected with terminal $K_1$ of the high-voltage coil P of the transformer $T_1$. $C_2$ is connected to the terminal $K_2$ of the alternate-current motor W and the terminal $K_3$ of the low-voltage coil S of the transformer $T_1$. Thereby the ratio of transformation of the transformer corresponds to the two voltages of the contact-wires $L_1$ and $L_2$.

If there are very complicated or otherwise-difficult crossings and sidings on the high-voltage section of the line, short sections may be established there with a low-voltage local supply, while the high-voltage contact-wire may be interrupted. On such sections with a local supply of low pressure the contact-wire will be arranged similar or equal to the contact-wires in large stations which have a low-voltage supply. Such sections being generally short enough to be passed by trains at the expense of a part of the energy stored in their moving masses, this local pressure-supply will be obtained by means of static transformers having an output not much superior to that consumed by the motor-generator on the locomotive when running idle.

Fig. 4 is to give an idea of how two lines of different voltages may be arranged on certain places along the same track. To insure an uninterrupted supply of current to the locomotive for a certain length of track, both lines $L_1$ and $L_2$ must be established and both current-collectors $C_1$ and $C_2$ must make contact. To prevent trouble from both $C_1$ and $C_2$ making contact at the same time and feeding to the motor W for a long time, switches A and $K_3$ are provided, Fig. 3.

Referring again to Fig. 3, it will be seen that the switch A may be so arranged as to make the one current-collector $C_2$ useful for leading current to the motor W directly or through the transformer $T_1$. In this way $C_2$ is a reserve for $C_1$.

Having thus described our invention, what we claim as new therein, and desire to secure by Letters Patent, is—

1. In an electric-railway system, the combination with alternate-current line-sections having different voltages; of a car, an alternate-current motor thereon, a continuous-current generator coupled thereto, motors operated by the continuous current generated and transformers to bring the voltages of the sections of line to the voltage required by alternate-current motor, all on said car, substantially as described.

2. In an electric-railway system, the combination with sections of line of alternating current, the one carrying a high voltage and the other a low voltage; of a car, an alternating-current motor wound for the low voltage, a direct-current generator driven by said motor, motors operated by the direct current generated, a static transformer wound for the two different voltages, means to supply the low voltage directly to the alternate-current motor and means to collect current from the high-voltage sections and supply to the high-tension winding of said static transformer, substantially as described.

3. In an electric-railway system, the combination with alternate-current line-sections having different voltages, of a car, an alternate-current motor thereon, a continuous-current generator driven by said motor, motors operated by the continuous current generated, means to vary the excitation and means to vary the current supplied to the armatures of the continuous-current motors, means to collect the low voltage from the low-voltage sections and supply it directly to the alternate-current motor, means to collect the high-voltage current, and a step-down transformer to reduce the high voltage to that required before supplying to the alternate-current motor.

In testimony whereof we have signed our names to this specification in the presence of two subscribing witnesses.

RUDOLF ALFRED EMIL HUBER.
HANS HUGO CARL BEHN-ESCHENBURG.

Witnesses:
E. CANNES,
A. LIEBERKNECHT.